March 22, 1955 J. F. CUMMINGS 2,704,651
EQUALIZING LOADS ON MULTIPLE CABLES
Filed July 3, 1952 2 Sheets-Sheet 1
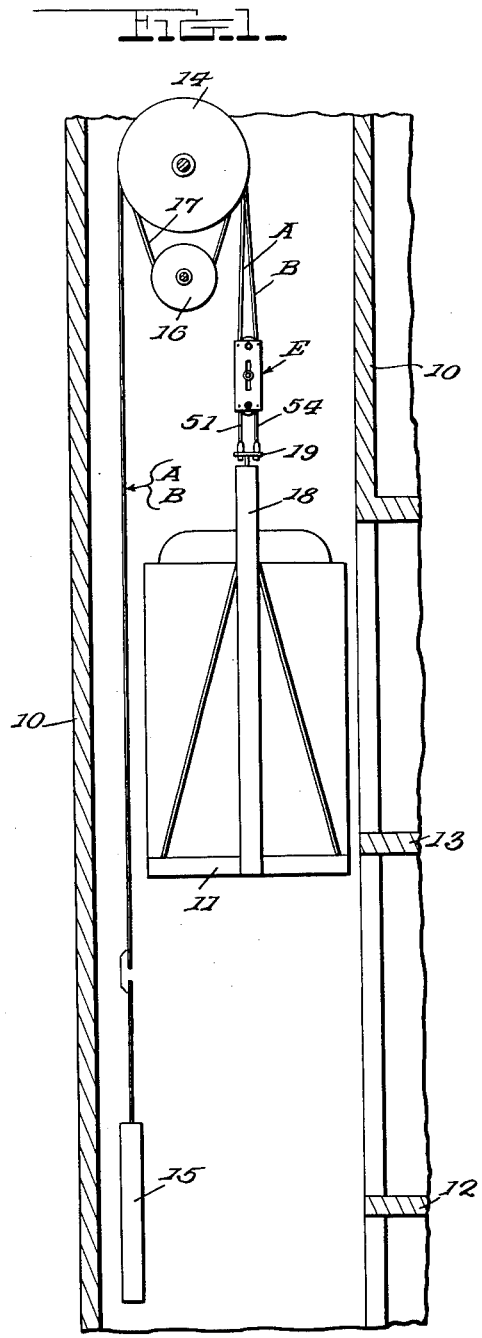
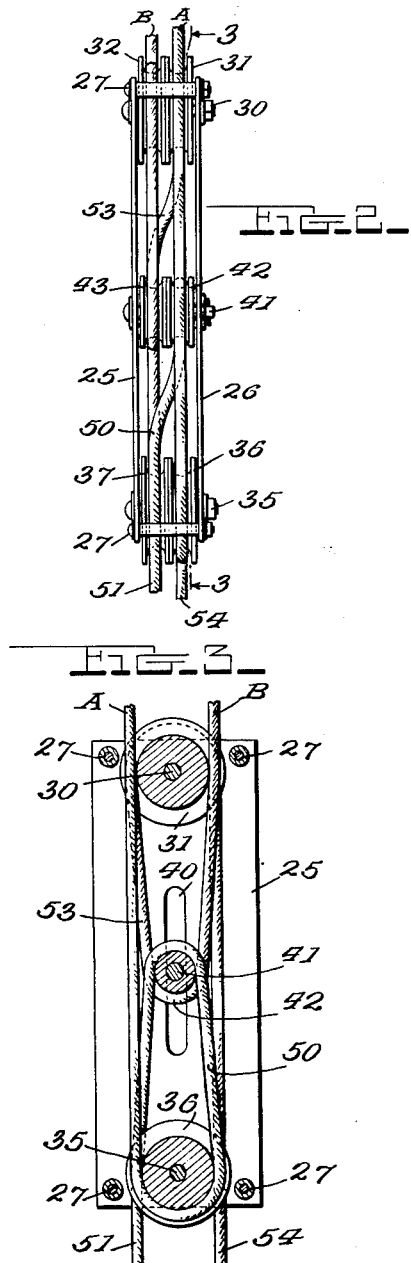
INVENTOR
James F. Cummings
BY *Mason, Porter, Diller & Stewart,*
ATTORNEYS March 22, 1955  J. F. CUMMINGS  2,704,651
EQUALIZING LOADS ON MULTIPLE CABLES
Filed July 3, 1952  2 Sheets-Sheet 2
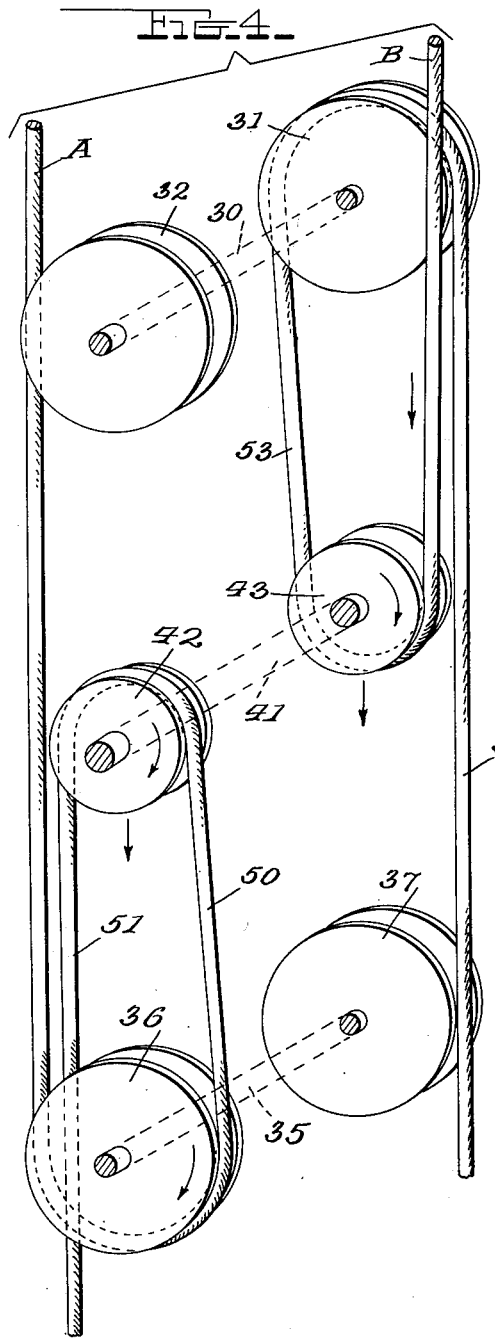
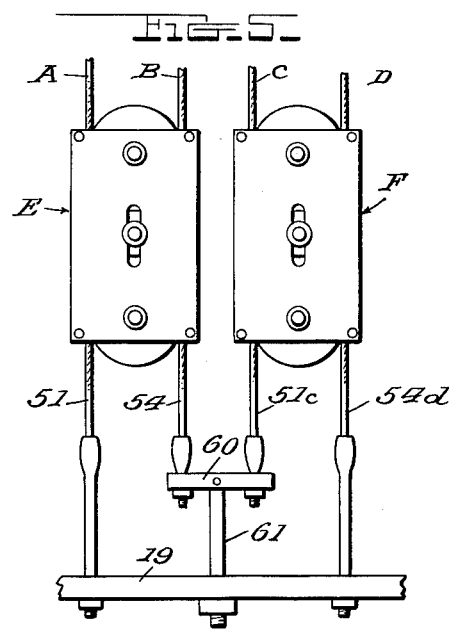
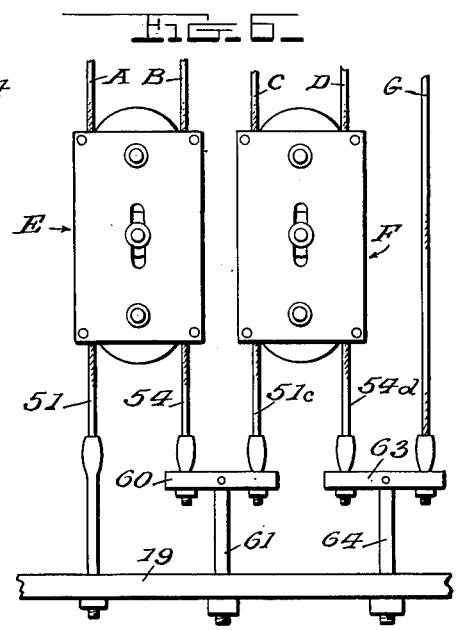
INVENTOR
James F. Cummings
BY  *Mason, Porter, Diller & Stewart,*
ATTORNEYS

United States Patent Office 2,704,651
Patented Mar. 22, 1955

2,704,651

EQUALIZING LOADS ON MULTIPLE CABLES

James F. Cummings, Belleville, N. J., assignor of one-half to Edward T. Blackledge, Scranton, Pa.

Application July 3, 1952, Serial No. 297,151

4 Claims. (Cl. 254—135)

This invention relates to systems in which the total load is distributed among multiple cables, with equalizing of the individual loadings thereof.

One of the features of the invention is the provision of an equalized system in which the individual cables may be secured at both ends respectively to tension-producing elements, with the inclusion of equalizing devices for distributing the total load upon the respective cables, by load-transferring means interconnecting the cables.

Another feature of the invention is the provision of an equalizer structure for interconnecting a pair of cables and having a traveling member which is acted upon by both cables and by its movement serves to distribute and equalize the loadings upon the two cables.

A further feature of the invention is the provision of a load-distributing device for interconnecting a pair of cables and including a traveling member which is acted upon by both cables and is moved in one direction when the loading upon one cable is greater than the predetermined proportion of the total load, and is moved in the opposite direction when the load on such cable is less than said predetermined proportion; and wherein the converse operation as to direction occurs upon greater or lesser loadings of the other cable.

A feature is the provision of an equalizer structure which occupies a minimum of space, which can operate in any position; and which is postive in action and free from the elastic bouncing and vibration present when equalizing springs are used. As a unit, it is capable of compensating two cables; and can be employed in multiple for compensating a corresponding number of pairs of cables.

With these features as objects in view, illustrative forms of practice of the invention are shown in the accompanying drawings, in which:

Fig. 1 is a conventionalized showing of employment of the invention with an elevator, indicating the employment of a pair of cables having the present equalizer structure applied thereto.

Fig. 2 is an enlarged edge view of the equalizer structure, the positions of parts of the cable being conventionalized for clearness.

Fig. 3 is an upright section essentially on line 3—3 of Fig. 2.

Fig. 4 is a conventionalized perspective showing of the arrangement of the sheaves and cables in Figs. 1–3.

Fig. 5 is an enlarged view, showing the use of two equalizer members for distributing the total load upon four cables.

Fig. 6 is a view similar to Fig. 5, showing the equalization of loadings upon five cables.

In many mechanical devices, it is a safety practice to employ multiple cables to support loads and transmit forces; examples are power shovels and cranes, mine cars, elevators and other lifts, etc. However, it is known that multiple cables can be employed with greatest advantage only when the loadings on the individual cables are distributed in a predetermined proportion. When two essentially identical cables are employed, with half of the total load intended to be placed upon each, this distribution may not be attained, or may be lost in service, due to errors in original lengths of the cables between end connections, the friction of the turns about the winding drum, variances in effective drum diameters, different stretchings under a given load, different shortenings upon fall of temperature, different car loadings at successive trips, the acceleration or speed of the car in producing different effective lengths of the cables, mechanical faults in the cables themselves such as twisting or kinking, and other conditions known to engineers in this field. Also, the tension on the several cables of a group produces unequal variations in length under heavy load; and differences in the tensions on the individual cables bring about slippage and unsmooth operation. Any stretching in one cable under heavy load will lead to looseness; so that the cable will not later carry its intended part of the load and such a cable may sway in an elevator hatchway, for example, and cause objectionable noise. The cable which is most unyielding comes to bear the greatest part of the load, and is most apt to break and cause damage. These conditions are further aggravated when more than two cables are used.

While some of these difficulties may be resolved by employing springs on each cable, this procedure operates by production of varying and unequal stresses in the springs so that each spring performs differently from the others; and there is a general tendency of the car to spring or bounce as it is stopped or started.

In the illustrative form of practice, it is assumed that the cables are essentially identical, and that equal loadings are to be placed thereon.

In the illustrative construction, a conventionalized elevator system is shown in Fig. 1, with employment of an equalizer of the instant type. The shaft walls 10 receive an elevator car 11 which can move between the floors 12, 13. At the upper end of the shaft is provided a winding drum 14 about which passes the cables A, B, these cables returning downward in the shaft and being connected to the counterweight 15. A source of power such as a reversible electric motor 16 rotates the drum 14 through the belt 17. The frame 18 of the car supports at the top thereof a tie-plate 19 to which are connected the ends of the cables A, B.

The equalizer structure E comprises (Figs. 2 and 3) a support having the two side plates 25, 26 which are connected fixedly together by bolts and spacer elements 27. At the upper end of these plates, and in a fixed position relative thereto, is the pivot or axle 30 upon which can independently rotate a guide sheave 31 and a turning sheave 32. At the lower end is correspondingly located a fixed pivot or axle 35 upon which are independently rotatable a turning sheave 36 and a guide sheave 37. The axles 30, 35 thus provide pivots whose axes are spaced fixedly apart and parallel.

The plates 25, 26 have slots 40 therein, these slots extending along the plane joining the axes of axles 30, 35. A traveling member comprising an axle 41 and the two turning sheaves 42, 43 independently rotatable thereon can move upward and downward between the axles 30, 35, and is guided by the slots 40.

The cables A, B so rove about the sheaves that they exert opposing forces upon the traveling member. The portion of a cable between the counterweight 15 and the winding drum 14 will be referred to as the counterweight portion, and the portion between the winding drum and the equalizer structure E will be referred to as the lift portion: it being understood that theoretically the lengths of the counterweight portion and the lift portion vary inversely, with the total of the two lengths remaining constant. In practice, one or both of these portions will vary in length from time to time, and this variance may differ for the two cables illustrated in Figs. 1–4, so that an equalizing or re-distributing action becomes necessary.

The lift portion of cable A is guided (Figs. 3 and 4) by the sheave 32 on the fixed axle 30, and has a bight around the turning sheave 36 on the lower fixed axle 35, with an adjustment portion 50 extending upwardly to the turning sheave 42 of the traveling member having the axle 41, and thence extending from the turning sheave 42 downwardly as a portion 51 which is connected (Fig. 1) to the tie-plate 19 at the top of the elevator car. Conversely, the lift portion of the cable B extends downwardly and has a bight around the turning sheave 42 of the traveling member, and passes thence by an adjustment portion 53 to the turning sheave 31 on the upper fixed axle 30, and thence downwardly again by the portion 54 which (Fig. 1) is likewise connected to the tie-plate 19 at the top of the elevator car. It will be noted that the cables A, B have their lift portions at opposite sides of the fixed axles 30, 35; and that the portions of cable A extend from the lift portion in counterclockwise directions about the sheaves 36, 42, while the corresponding portions of the cable B extend in clockwise directions about the sheaves 42, 31.

Assuming that one cable, for example A, retains its original dimension both as a total and for each segment thereof, while the other cable B stretches or becomes relatively longer in the lift and counterweight portions thereof, the operation of the system may be described as follows, assuming that the equalizer device is located so close to the elevator car, that is, to the load, that any changes of length within the equalizer and between the equalizer and load can be disregarded in a simple explanation. The lengthening of the cable B means that its support of the sheave 43 lessens, and the sheave 43 with other parts of the traveling member moves relatively downwardly as shown by the arrow in Fig. 4, the sheave 43 rotating in the direction indicated by the curved arrow. The downward movement of the traveling member, including the axle 41 and the sheave 42, is accompanied by a relative taking up of a part of the length of the portion 51 of cable A, which part is delivered by the sheave 42, rotating in the direction of the curved arrow, toward the portion 50 of the cable A, and this portion 50 in turn delivers a part around the turning sheave 32, which moves in the direction of the curved arrow, so that the lift portion of the cable A, between the winding drum 14 and the turning sheave 36 is effectively increased by an amount corresponding to the increase of the length of the lift portion of the cable B between the winding drum 14 and the turning sheave 43. It will be noted, however, that this has been accomplished with no change of the length of the portion 54 of cable B, and by rotation of the several sheaves without necessary movement of the equalizer structure E as a whole.

Upon the stretching of the cable B, the relative loading thereof decreased, while correspondingly the loading of cable A increased: it being presently assumed, for this simple explanation, that the same total load, being that of the car 11 and its contents, has remained constant. Considered from the viewpoint of loading, therefore, the greater weight which is being carried by the portion 51 of cable A has drawn the traveling members 41, 42, 43 downwardly toward the lower pulleys and their pivot 35, wherewith the downward movement of the sheave 43 has placed a greater load upon the lift portion of the cable B, and therewith upon the portions 53, 54 thereof, until ultimately the loadings are equal again.

Thus, either the stretching of cable B, or a greater load upon cable A, has the result of producing an equalization through the same relative movement of the traveling member. By similar effects, a shortening of the cable A will be compensated. Conversely, if the cable A stretches, or a greater loading occurs on cable B, equalization is effected, but through a relative upward movement of the traveling member including elements 41, 42, 43 toward the upper pulleys and their pivot 30. Thus, equalization of the loading of cables A and B is effected when either cable becomes shorter or longer, or when the cables lengthen or shorten by different amounts, or when one lengthens and the other shortens; or when the change of loading occurs by effects at the counterweight or car connections, or at the winding drum, or elsewhere along the lengths of the respective cables.

In the form of Figs. 1–4, the system has been described for compensating between two cables intended to carry equal loads, so that the structure operates as an equalizer between these two cables A, B.

The system may also be employed with any even number of cables, employing an equalizer structure for interconnecting the two cables of each pair, with a further equalizing means between a cable of one pair and another cable or another pair. If an odd number of cables is present, the un-paired cable may be connected to a cable of one of the equalizer structures, through a separate equalizing element.

Thus, in Fig. 5, the cables A, B are equalized by an equalizer structure E, with their portions 51, 54 respectively connected to the tie-plate 19 and to a pivoted equalizer bar 60. Correspondingly, the cables C, D are interconnected by an identical equalizer structure F, with the portion 51c connected to the pivoted equalizer bar 60, and the portion 54d connected directly to the tie-plate 19. The pivoted equalizer bar 60 is itself connected to the tie-plate 19 by the standard 61. With this structure, differences between the cables A and B will be compensated as before, and likewise differences between cables C and D: insofar as such changes do not establish changes in relative loads upon the portions 54, 51c. If, for example, both cables C, D relatively shorten, as compared with cables A, B, then any differences between cables C, D will be equalized by the equalizing structure F, but there will also be a greater loading upon the portion 51c, and therewith the equalizer bar 60 will rock, and transfer some of this loading to the portion 54, and thereupon an equalization will occur in the equalizer structure E so that the final result is that one-quarter of the total load is carried by each of the cables A, B, C, D in this illustrative form.

Correspondingly, in Fig. 6, the five cables A, B, C, D, E are employed to support a load connected to the tie-plate 19. The equalizer structures E, F are identical, and each individually serves to balance the loading of their respective cable pairs A, B, and C, D. The end portion 51 of cable A is directly connected to the tie-plate 19. The end portion 54 of cable B and the end portion 51c of cable C are connected to a pivoted equalizer bar 60 which in turn is connected by the standard 61 to the tie-plate 19 which is shown in Fig. 6. The end portion 54d of cable D is connected to a second pivoted equalizing bar 63 which in turn is connected to the tie-plate 19 by the standard 64. The fifth cable G is connected to the opposite end of the pivoted bar 63. The operation of this structure is the same as before, with the equalizers E, F serving constantly to divide the loadings upon their respective cable pairs A, B, and C, D. If, for example, the cable G lengthens or the load thereon lessens for any reason, the bar 63 will rock, reducing the loading on the portion 54d. The equalizer structure F then operates to re-distribute the loadings between the cables of the pairs C, D, with a corresponding reduction of loading on the cable portion 51c, so that the bar 60 now operates to cause a corresponding action within the equalizer structure E upon its cable pair A, B so that ultimately one-fifth of the total load is carried by each of the five cables.

The illustrative forms of practice are not restrictive, and the invention may be practiced within many ways within the scope of the appended claims.

I claim:

1. A multiple cable and equalizer structure, comprising a pair of multiple cables, a frame movable along said cables, first and second pulleys mounted on parallel axes fixedly spaced along the frame in the direction of the cables, a third pulley means rotatable about an axis parallel to and between the axes of said first and second pulleys, means on the frame to guide said third pulley means so that the axis thereof is limited to movement in a plane through the axes of the first and second pulleys; one said cable being positioned with its run extending past a first pulley and a third pulley, thence turning about a second pulley and a third pulley successively and continuing in its run past the second pulley again; the other said cable being positioned with its run extending past a first pulley, thence turning about a third pulley and a first pulley, and continuing on its run past the third pulley again and past a second pulley.

2. A multiple cable and equalizer structure comprising a pair of cables, a frame having spaced plates, a pair of end pivots secured in the plates with their axes thereof spaced fixedly apart and parallel, the plates having opposed slots located in the plane joining said axes and between said pivots, an intermediate pivot movable in said slots, and pulleys on said pivots; one said cable having its run extending past one end pivot and the intermediate pivot, thence turning successively about pulleys on the other end pivot and the intermediate pivot, and thence continuing its run past the said other end pivot; the other said cable having its run extending past the said one end pivot, thence turning successively about pulleys on the intermediate pivot and the said one end pivot, and thence continuing its run past the intermediate and said other end pivot.

3. A cable and equalizer structure having a frame, first and second pulleys mounted on the frame for movement about fixed axes spaced along the frame in the direction of the cables, a pair of third pulleys mounted on an axis parallel to and located between the axes of said two pairs, said frame presenting means for guiding said pair of third pulleys during movement toward and from the first and second pulleys, and a pair of cables each extending past the frame, one cable passing around the first pulley and one of said third pulleys and the other cable passing around the other said third pulley and said second pulley, whereby a load on said one cable tends to move the third pulleys toward said first pulley and a load on the said other cable tends to move the third pulleys toward said second pulley.

4. An equalizer structure for cables, having a frame comprised of two spaced plates, first and second pulleys mounted on parallel axes fixedly spaced along the frame in the direction of the cables, the plates having opposed slots located in the plane joining the said axes and between said first and second pulleys, an axle movable in said slots, a pair of third pulleys on said axle, the walls of the slots in said frame cooperating with the axle and third pulleys to hold the said axes parallel and in the same plane.

References Cited in the file of this patent

UNITED STATES PATENTS

| | | | |
|---|---|---|---|
| 943,956 | Sawyer | Dec. 21, | 1909 |
| 1,550,353 | Evans | Aug. 18, | 1925 |
| 1,841,958 | Kendall et al. | Jan. 19, | 1932 |
| 1,854,182 | Erwin | Apr. 18, | 1932 |
| 1,977,509 | Ferguson | Oct. 16, | 1934 |